United States Patent Office 3,666,535
Patented May 30, 1972

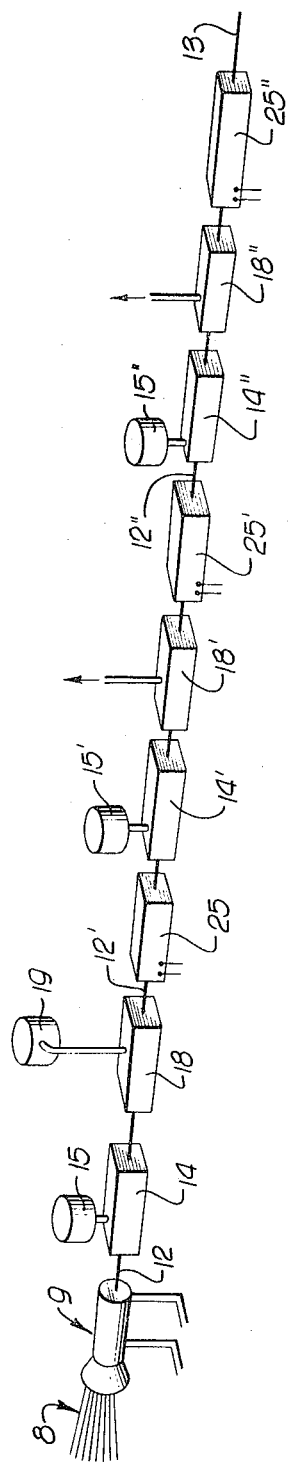

3,666,535
METHOD OF MAKING POROUS OBJECTS
Donald D. Woolley, Alhambra, and Elden L. Goodenow, Los Angeles, Calif., assignors to The Gillette Company, Boston, Mass.
Filed Apr. 9, 1970, Ser. No. 26,849
Int. Cl. B05c 8/04; D02g 3/36
U.S. Cl. 117—98                8 Claims

ABSTRACT OF THE DISCLOSURE

Improvements in continuous methods of manufacturing elongated porous, absorbent and strong objects made of filamentary materials, provided with longitudinally extending channels through which fluid such as ink, may flow by capillary action, the filamentary material being bonded together and the size of the capillaries controlled by repeated applications of a bonding resin. Also relates to porous objects made by the method, said objects when used in writing instruments having greater durability and wear resistance, strength, resistance to feathering and longer life in the production of uniform writing traces.

BACKGROUND OF THE INVENTION

Elongated, porous, absorbent, coherent and self-supporting objects made of filamentary materials and provided with longitudinally extending channels through which fluid, such as ink, may flow by capillary action, have been used in writing instruments as writing points and as ink storage reservoirs. Their characteristics and continuous processes for manufacturing such objects have been disclosed in copending applications filed by Elden L. Goodenow, James O'Sullivan and Daniel W. Seregely, Ser. No. 560,405 filed June 27, 1966 (now Patent 3,558,-392) and Ser. No. 886,899, filed Dec. 22, 1969, copending herewith. When applied to the manufacture of porous writing points for writing instruments, the prior copending applications control the characteristics of such points by a series of steps including the compaction of a plurality of pre-positioned strands of yarn made of synthetic filaments to a desired cross-sectional size and configuration by a preliminary partial or incipient sintering of the strands to each other with desired longitudinally extending channels between some of the strands, followed by the step of impregnating the pre-sintered and pre-set bundle of strands with a resin in solution in a volatile solvent, evaporation of the solvent and a curing of the resin in the bundle. The present invention may be said to provide improvement in the method whereby the strength of the writing point is increased, the distribution of the resinous bonding agent is more readily controlled and homogeneously distributed within the bundle and the characteristics of the resulting object are improved. The mode of operation and the effects produced by the method hereinafter disclosed was not predictable or obvious and had to be demonstrated.

When porous and absorbent objects made of generally aligned filamentary material are employed as ink storage reservoirs in the barrels of writing instruments, the presence of a relatively strong and more firmly bonded external surface layer on the surface of the object is desirable, since the insertion of the reservoir into the barrel can be readily accomplished with minimal damage to the porous ink reservoir element, the central or core area of such element being finely porous and having great absorptive and capillary characteristics but lower strength. However, when the object is used as a writing point, the presence of a highly bonded external layer and a soft, less bonded axial core area is not always desirable; the harder, external skin area may produce undesirable scratching and squeaking during writing. Moreover, pressure exerted on the writing point during writing is usually transmitted to the central or axial area from the surface being written upon; when the writing point has a conical end contour and the central portion is softer than the external surface of the stem of such point, the point itself will tend to "brush out," become deformed, the width of the writnig trace will be increased and the line will not be of uniform width. Non-uniform ink feed or laydown is often observed.

The present invention constitutes an improvement upon prior continuous processes of manufacturing porous, self-sustaining objects for use in writing instruments and is particularly adapted for use in the manufacture of writing points in that the resulting porous object is more homogeneous in its strength and coherence, and the axial portion is better adapted to withstand pressure during writing without fraying or brushing out and a narrow line of uniform width may be obtained for a long period of use. The resin or bonding agent employed is not concentrated at or adjacent to the external surface of the object and thereby the undesirable effects often observed as stated in the preceeding paragraph are eliminated or greatly reduced.

Generally stated, the method of the present invention is directed to a series of successive steps in which a moving bundle of filamentary material or silver is repeatedly impregnated with a dilute solution of resin in a volatile solvent, each of said impregenations being followed by the removal of solvent and curing of the resinous material. Preferably a bundle of strands of yarn of filamentary material in predetermined array is initially compacted and pre-set, under tension and in virtually parallel relation, by a very light sintering step before the sequence of successive impregnation steps. The prearrangement, compaction and heat setting results in the controlled distribution of larger, ink-conveying channels between lightly sintered together strands. Control of size of the channels extending longitudinally through the objects and used in conveying the ink is attained by control of the concentration of bonding agent in the impregnating solutions so that the minute channels, which normally are not effective in conveying ink become filled with the bonding agent (thereby adding strength to the final object) while the larger channels are employed for the supply of ink to the writing point. As hereinafter disclosed, the resulting writing points are capable of supplying inks at an adequate rate so as to permit writing in strokes, lines and traces of desired width and density without starvation, thinning out or interruptions in continuity and integrity of line. It is to be remembered that the act of writing is such an individualistic expression that even a mathematically minor change in writing character of an instrument may be recognized by the user, who either praises or condemns the instrument, depending upon the direction of change. Dependable, smooth and uniform starting, continued uniformity of "laydown" during writing, frictionless and squeakless writing and ability to withstand changes in writing pressure, accidental blows upon the writing point without brushing out or permanent deformation or other impairment of writing properties are highly desirable characteristics upon which the commercial success of a writing instrument often depends. It is believed that the present invention attains all of these desirable objectives.

In order to facilitate understanding, the following description will refer to the appended drawing in which:

FIG. 1 is a diagrammatic perspective of equipment employed in the continuous manufacture of the porous objects of this invention, certain preliminary and subsequent steps being eliminated since they are disclosed in the copending applications hereinbefore noted.

The porous coherent and self-supporting objects, provided with longitudinally extending channels, are preferably made of strands of yarn made of synthetic filamentary materials. The filamentary material may be a polyamide, a polyester, polyethylene, polytetrafluoroethylene, etc. or mixtures of such filaments with or without the presence of natural filamentary material such as cotton or cellulosic derivatives. Synthetic filamentary materials may include monofilaments of circular, tubular, polygonal, or lobed cross-section which may be crimped or uncrimped and which may be extremely long or fairly short before being made into strands of yarn. The denier of such filaments may vary from about 1.5 to 30 d.p.f. The total denier of filamentary material in an object for use in writing instruments will of course depend upon the cross-sectional area of such elongated object and whether it is to be employed as a writing point or as an ink storage element. The total denier of the filament in a writing point or bundle of fibers from which a writing point with 0.1 inch diameter is made may vary from about $2 \times 10^4$ to about $3.1 \times 10^4$. Strands, yarns or ropes of such filamentary material are generally fed from suitable bobbins, reels, spools or other sources to a perforated gathering or arranging plate, each strand passing through a given aperture in a given location and the entire prearranged bundle then drawn in virtually parallel relation through a funnel-like opening into a heat-setting zone generally indicated at 9. This tunnel or heat-setting zone is preferably lined with "Teflon" or other heat-resistant and smooth, friction-proof inner surfacing; the jacket of such tunnel is heated either electrically or by means of circulating hot oil and the temperature to which the compressed bundle is subjected in such tunnel should be sufficient to very lightly sinter at least some of the strands together, this temperature being generally slightly below the melting point of the synthetic filamentary material being employed.

FIG. 1 does not indicate the supply reels nor the perforated gathering or arranging plate, but the bundle of fibers discharged from the arranging plate is relatively large in comparison with the diameter of the heat-setting zone 9, which establishes the precise diameter (or other configuration) of the final object which is to be produced. Moreover, between the arranging plate and the compression and heat-setting which takes place in unit 9, the relatively spaced and loose bundle of strands or yarn may be subjected to a cleansing operation or dehumidification by means of dry of inert gases or the like. The incoming bundle of strands is indicated at 8.

The heat-set object indicated at 12 and drawn from the heat-setting oven 9 is a coherent, self-supporting object of desired configuration with channels between strands and is drawn through a plurality of successive contact zones indicated at 14, 14' and 14" in FIG. 1, each of said zones being provided with means 15, 15' and 15", respectively, supplying a solution of bonding agent in a volatile solvent to said zones so as to accomplish an impregnation of the coherent continuous object 12 being pulled through said zones. Each of the contact zones is provided with means for maintaining a suitable level of impregnating solution therein and means for maintaining the impregnating solution at a desired temperature, which is below the boiling point of the solution and below the curing temperature of the resinous bonding agent in solution therein. Moreover, it is to be remembered that FIG. 1 is diagrammatic only and illustrates but a single production line whereas in practice, the impregnating zones are in the form of relatively flat chambers through which a number of combined, pre-set objects 12 in spaced relation may be simultaneously drawn.

The solvents employed in the impregnating solution should be relatively volatile and preferably capable of being removed at temperatures not greatly exceeding 125° C. and, at all events, below the melting point of the fibers. It has been found that solvents compatible with the resinous bonding agents can be selected from ethers, esters, alcohols, aromatics, chlorinated solvents, ketones or glycol ethers, and may have boiling points as high as 175° C. or as low as 35° C. (diethyl ether).

A great variety of bonding agents or resins may be employed and those skilled in the art will appreciate that different catalysts, hardeners or curing additives may be used if setting or curing of the resin requires their presence. Addition polymers such as the epoxies, isocyanates, polyesters, vinyl compounds, acrylics, alkyd resins, silicones and acetals may be used. Various condensation polymers such as phenolics, resins of the melamine—urea formaldehyde type, aldehydes such as the furane plastics, furfuraldehyde resins and monomers, acrylics such as Du Pont's Lucite polymers and epoxy resins as well as many other similar thermoplastic systems can be employed. It is also to be remembered that the selection of the resin depends somewhat upon the characteristics of the synthetic filamentary material being employed. The control of concentration of resin in these impregnating solutions is very important and will be discussed hereinafter.

After each impregnating step as indicated by zones 14 and 14', the impregnated pre-set and coherent article or continuous rod is pulled through a solvent removal zone indicated in FIG. 1 at 18 and 18'. Each solvent removal zone is of course provided with controllable heating means so as to insure the removal of substantially all solvent during the passage of the object therethrough and each of the zones 18 may be provided with a suitable vent and perhaps a condenser 19 for the recovery of the solvent. It is desirable to substantially completely remove all of the solvent from the impregnated rod or object before subjecting it to a successive impregnation; it is preferred but not essential or necessary to subject the substantially dry impregnated and dried rod to a curing step before a successive impregnation is conducted. In FIG. 1 the rod, after its initial impregnation at 14 and evaporation of solvent at 18, is shown at 12' passing directly into a curing oven 25, after which the rod is passed directly into the succeeding impregnating chamber or zone 14' and then through the evaporating zone 18' and into the secondary curing oven 25'.

A typical curing oven may consist of a chamber through which hot air is circulated by means of a motor driven fan or radiant heat may be employed within the drying chamber to which the preformed object is continuously drawn. The temperatures maintained in a curing oven depend upon the resinous binder or composition used. Details of construction of such a curing oven are not illustrated since they are not part of the present invention.

Although two successive impregnations, each followed by evaporation of solvent and a curing step, under conditions here disclosed, are sufficient for objects destined for some uses, three or four successive impregnations produce better writing points. FIG. 1 shows the twice treated rod 12" passing into impregnation zone 14", then through an evaporator 18" and then final curing chamber 25" from which the rod 13 is pulled by suitably contoured grasping and driven rollers.

Since the process of manufacture is continuous and the product is drawn through the sequence of treating zones by suitable sets of drawing rollers adjacent to the discharge end of the production line, at a regulated speed and tension, the length of the impregnation zones can be varied to control depth of impregnation. Attempts to apply increased amounts of resin to axial portions of a rod by the use of solutions containing from between about 35% to 50% of resin have not been entirely successful since the viscosity of these solutions appears to preclude deep penetration unless the length of the impregnating zone is increased excessively, and "lay-down" of ink is impaired, since the main ink-conveying channels become restricted. When making strong writing points, capable of fine line writing, it is desirable to successively impregnate to the center or axis of the core by the use of lower concentrations, and the impregnating zones may be of equal length (correlated to the speed of the rod) to provide a sufficient time factor for such deep impregnation.

The concentration of the resinous bonding agent in the impregnating solution may vary from about 5% to 30%. In the manufacture of writing points having the improved characteristics hereinbefore referred to, the initial impregnation is preferably conducted with a solution containing between about 18% and 30% of the bonding resin for a time and under conditions which insure thorough impregnation. The entire impregnating zone may be subjected to high frequency vibration in order to expedite such deep impregnation. Subsequent impregnations may be at lower concentrations of say, 20%, 16%, 12% or 5% and, if more than one subsequent impregnation is used, the resin concentrations may be at successively lower concentrations. Although evaporation and curing after each impregnation is preferred when the multiple impregnation process is used, and the final curing should be carried out to completion, the steps of evaporating the solvent after the preceding impregnations may be followed by a partial curing, only sufficient to reduce the solubility of the resin employed and fix it in position within the rod, thereby reducing the tendency of such resin to redissolve in a succeeding solvent-resin impregnating solution during a succeeding step. When, for example, final or complete curing is attained at 180° C. for a rod travel time of 1 minute, a curing temperature of 100° C. or 140° C. may be used in ovens 25 and 25'. The desired distribution of resin and build-up in the central portion can also be obtained by using uniform temperatures in the curing zones, but shortening the pre-ultimate oven lengths.

For example, good writing points may be made by using 29 strands of 840/136 Nylon filaments and impregnating with a 28% solution of epoxy resin followed by two successive deep impregnations with 14% solutions of the same resin. Each impregnation was followed by removal of solvent and a resin curing step, the final curing being at a somewhat higher temperature than that used in the two preceding curing steps. These points had a diameter of 0.1" and a bulk density of 0.82 gram per cc. When used in a pen provided with a capillary reservoir containing a standard ink, they wrote extremely well with an average laydown of 0.375 mg. of ink per foot and a deviation of only 0.036 mg. and maintained a line width of 31.2 mils during a writing test conducted under a load of 300 grams. Measurements taken on the writing tips of writing points made in accordance with the present invention show that the wear of the tip is reduced by about 25% to 30%. As a result, the points are capable of continuing to write for long periods of time with the same width of line.

A comparison of rods made by using 26 strands of yarn, each yarn being composed of 6 denier filaments, one batch of rods being subjected to a single set for impregnation, evaporation and curing steps and another batch being subjected to three such sets, demonstrates the improved strength and uniformity of writing ability of the resulting points, contoured to identical size and shape.

| Number of impregnations | Resin content of solution, percent | Line width, mils |
|---|---|---|
| 1 | 28 | 45 |
| 3 | 28-14-14 | 34 |

Points were subjected to a writing test under 300 g. load and the line width of the ink trace at the end of the test is considered to be a good measure of point strength, a smaller line width denoting greater strength and durability. In addition to higher strength, the points produced by this process exhibit higher "lay-down" of ink, indicating that the repeated impregnation with dilute solutions does not clog the main ink-conveying channels.

The present method also contemplates a process of subjecting a pre-oriented bundle of filamentary strands (heat set in the absence of added bonding agent, to provide desired channels between strands) to multiple impregnation wherein the initial impregnation is with a solution of volatile solvent containing about 20% to about 30% of curable bonding resin, followed by evaporation of the solvent and curing of the resin, and then a second (or second and third) short time surface-type impregnation with a solution having a low resin content (on the order of less than 20%, say, 5%–10%). After the evaporation of the solvent, the product in process is rapidly cured. This modification is well adapted for use with resinous bonding agents which may suffer degradation if subjected to repeated or prolonged curing temperatures. The resulting product has an axial portion containing resin in sufficient proportion to provide strength and an outer annulus which provides a product with a protective skin. It has utility as a writing tip, as an ink reservoir, an applicator for dyes and cosmetics and other uses Some prior workers in this art were of the opinion that when a bundle of filamentary material was impregnated with a resin solution and the solvent permitted to evaporate, the resin would migrate to the radially outer portions of the bundle, leaving a weak central core. Attempts to impregnate with concentrated solutions of bonding resin (40%–50%) were unsuccessful since a sufficiently large proportion of ink-conveying channels were closed or blocked by the resin to inhibit adequate ink flow and as a result, ink starvation and inability to write rapidly or continuously with uniform laydown of ink was experienced.

Examination, at a magnification of 45× and higher, of cross-sections of writing points produced by multiple impregnation as herein described, disclosed that virtually uniform distribution of bonding resin, is obtained by this method. The ink-conveying channels (established by heat-setting the prearranged strands during their compression in the heat treating zone) are not clogged but are maintained effective in preventing ink starvation. The proportion of bonding resin on and in the strands contained in a centrally located area embraced by a circle of about ⅔ the outer diameter of a rod is virtually equal to and not appreciably smaller than that contained in the outer annulus surrounding such central area.

It is to be noted that the term "writing point" as used herein is not limited to a stylus, point or nib of a specific size, cross-section or shape; some points may be 0.03" to 0.1" in diameter and provided with conical, contoured or pointed ends. Other writing points may be of rectangular or polygonal cross-section and may vary from say, 0.03" x 0.1" to about 1.5" x 0.3" in cross-sectional dimensions with the ends cut on a slant, pointed, beveled, tapered or otherwise contoured. The latter points may be used on so-called "markers," cosmetic applicators, etc.

It has also been discovered that the secondary or tertiary treatment with a resin as bonding agent does not clog or fill up the larger fluid-conducting channels, but instead, it appears that the resin content of the more dilute solutions which are applied during the later stages flows into and deposits its resin content in the finest pores accessible to the solution. Since the initially applied resin has been insolubilized and set to an appreciable extent before the rod is subjected to a succeeding impregnation of a more dilute resin-solvent solution, migration of such initially applied resin is minimized. By the present process, the density and strength of the finished object is increased without interfering with the capillarity of the object and its ability to convey ink or other fluid properly, since the finest porosities contributes only slightly, if at all, to the flow of liquids.

We claim:

1. In a continuous method of making elongated objects provided with longitudinally extending channels and composed essentially of a compacted bundle of filamentary material, a method of controlling the distribution, size and fluid-flow characteristics of channels in such objects and the strength and wear-resistance thereof which comprises:

continuously impregnating a bundle of prearranged and compacted strands of yarn, each composed of filamentary material, said strands being in virtually parallel relation with channels between groups of said strands in the bundle, by drawing such bundle through a solution of a volatile solvent containing a resinous bonding agent;

then evaporating virtually all solvent from said bundle to deposit the bonding agent on said strands and subjecting the resin in such bundle to a temperature sufficient to reduce its solubility in a volatile solvent;

then again drawing the treated bundle through a solution of volatile solvent containing a lower content of resinous bonding agent to impregnate the bundle, evaporating the solvent therefrom and curing the resin contained therein.

2. A method as stated in claim 1, wherein the treated bundle resulting from the first impregnation and evaporation of solvent is subjected to another impregnation with a solution of volatile solvent containing a resinous bonding agent, followed by evaporation of virtually all solvent, before being submitted to the last stated impregnation, solvent evaporation and curing of the resinous agent.

3. A method as stated in claim 2, wherein the concentration of resinous bonding agent in the solution employed for the first impregnation is maintained at between about 20% and about 30% and the concentration of resinous bonding agent used in subsequent impregnating steps is maintained between about 5% and about 20%.

4. A method as stated in claim 1, wherein the prearranged bundle being treated is composed of synthetic filamentary material and said bundle of yarn strands has been previously compacted to a desired cross-sectional configuration and size by preliminary compression and heat-setting.

5. In a continuous method of making elongated objects provided with longitudinally extending channels and composed essentially of a compacted bundle of filamentary material, for use in writing instruments, a method of controlling the distribution, size and fluid-flow characteristics of channels in such objects and the strength and wear-resistance thereof which comprises:

establishing a plurality of contact zones and supplying a solution of resinous bonding agent in a volatile solvent to each contact zone;

controlling the concentration of bonding agent in the solution supplied to said zones;

continuously drawing a compacted bundle of filamentary material through said contact zones in succession and into contact with the solution supplied thereto;

evaporating virtually all solvent from said bundle between said successive contact zones and after the last contact zone of said succession, and finally subjecting the bundle to a temperature and for a time sufficient to cure the bonding agent in such bundle.

6. A method as stated in claim 5 wherein the concentration of resinous bonding agent supplied to the first of said contact zones is maintained at between about 20% and about 30% and that supplied to succeeding zones is maintained between about 5% and about 20%.

7. A method as stated in claim 5 wherein the compacted bundle being drawn through said contact zones is a bundle of strands of yarn, each composed of a plurality of filaments of synthetic filamentary material and wherein the concentration of resinous bonding agent supplied to the first of said contact zones is maintained at between about 20% and about 30% and that supplied to succeeding zones is maintained between about 5% and about 20%.

8. A method as stated in claim 6 wherein the bundle, after each step of evaporating virtually all solvent therefrom, is subjected to a temperature sufficient to virtually cure the resinous bonding agent in such bundle.

References Cited

UNITED STATES PATENTS 3,558,392   1/1971   Goodenow et al.

ROBERT F. BURNETT, Primary Examiner

L. C. KOECKERT, Assistant Examiner

U.S. Cl. X.R.

117—120, 138.8 N; 156—180; 161—176; 401—198